United States Patent [19]

Rodgers et al.

[11] 4,046,690

[45] Sept. 6, 1977

[54] FILTERING COAL-DERIVED OIL THROUGH A FILTER MEDIA PRECOATED WITH PARTICLES PARTIALLY SOLUBILIZED BY SAID OIL

[75] Inventors: Billy R. Rodgers, Concord; Michael S. Edwards, Knoxville, both of Tenn.

[73] Assignee: The United States of America as represented by the United States Energy Research and Development Administration, Washington, D.C.

[21] Appl. No.: 672,807

[22] Filed: Apr. 1, 1976

[51] Int. Cl.² .............................................. B01D 37/02
[52] U.S. Cl. .................................... 210/75; 210/193; 210/500 R; 427/180; 427/189
[58] Field of Search ................... 210/75, 193, 500 R, 210/502, 503, 504; 427/180, 189

[56] References Cited

U.S. PATENT DOCUMENTS

| 3,138,551 | 6/1964 | Jones et al. | 210/75 |
| 3,242,073 | 3/1966 | Guebert et al. | 210/75 |

FOREIGN PATENT DOCUMENTS

| 291,778 | 7/1967 | Australia | 210/193 |
| 786,207 | 11/1957 | United Kingdom | 210/193 |

OTHER PUBLICATIONS

"Phase I Report," ORNL-TM-4801 Oak Ridge National Laboratory, 1975, pp. 4-10.

*Primary Examiner*—Frank W. Lutter
*Assistant Examiner*—Frank Sever
*Attorney, Agent, or Firm*—Dean E. Carlson; Stephen D. Hamel; Allen H. Uzzell

[57] ABSTRACT

Solids such as char, ash, and refractory organic compounds are removed from coal-derived liquids from coal liquefaction processes by the pressure precoat filtration method using particles of 85-350 mesh material selected from the group of bituminous coal, anthracite coal, lignite, and devolatilized coals as precoat materials and as body feed to the unfiltered coal-derived liquid.

7 Claims, 3 Drawing Figures

FILTERING COAL-DERIVED OIL THROUGH A FILTER MEDIA PRECOATED WITH PARTICLES PARTIALLY SOLUBILIZED BY SAID OIL

BACKGROUND OF THE INVENTION

This invention was made in the course of, or under, a contract with the Energy Research and Development Administration. It relates in general to the art of coal liquefaction and more specifically to the separation of solids from coal-derived liquids by the pressure precoat filtration method.

In the field of coal liquefaction, raw coal is pulverized and treated by a variety of methods to provide liquified products. Such liquified products may be provided by simply heating the coal under appropriate conditions or by reacting the coal with hydrogen or hydrogen containing gases (such as steam) to provide hydrocarbons of higher degrees of saturation than the raw coal. Regardless of the particular liquefaction process, the liquified product (coal-derived liquid) is a viscous slurry having a very complex chemical composition consisting of hydrocarbons of various boiling ranges, tars, asphaltenes, and other liquids as well as up to 25 wt. % solids which include ash, char, and refractory organic compounds. These solids must be separated at some stage in the liquefaction process: (1) to prevent scaling, plugging and fouling of downstream equipment and (2) to remove contaminant sulfur and ash from the final product. A sizable percentage of the solid content of coal-derived liquids is in the micron to sub-micron size range. The problem of separating fine ash, char and refractory solids from unfiltered coal-derived liquids is probably the single most important problem facing the development of an extensive coal liquefaction industry. The problem is especially challenging for processes that seek to produce boiler fuels by relatively low severity hydrogenation such as solvent refined coal processes, since such processes produce the most viscous fuels. Our process is a solids/liquid separation method which is useful for separating solids from a variety of coal-derived liquid slurries regardless of source. For purposes of this disclosure, the term "coal-derived liquid" refers to the liquid carbonaceous product from any coal liquefaction process such as pyrolysis, solvent refining, COED, Synthoil, hydrocarbonization, etc. Typical coal liquefaction processes for which the filtration method of this invention would be useful are more fully described in *Chemistry of Coal Utilization*, H. H. Lowry, Ed., John Wiley & Sons, Inc., New York and London, 1963, pp. 1041-1080, which is herein incorporated by reference.

Our method is an improvement in the pressure precoat filtration of coal-derived liquid slurries. Pressure precoat filtration as applied to coal-derived liquids is a solids/liquid separation technique which comprises passing the slurry under pressure through a layer of precoat material (supported on a mesh or other support) which is capable of retaining solids from the slurry and causing the build-up of a filter cake on the precoat. As the filter cake builds up, it covers the precoat material and functions itself as a solids separation means. During filtration then the filter cake and the precoat material function in combination as the filtration means. As the filtration progresses, the filter cake increases in thickness causing a gradual decline in filtration rate. Accordingly, the filter cake or a portion thereof must be periodically removed to restore filtration rates to appropriate valves. Since coal-derived liquids typically contain large amounts of solid carbonaceous materials, the removed filter cake should be recovered and used as feed to a subsequent gasification step where it can be treated by any suitable coal gasification process to recover hydrogen or carbon monoxide for use upstream or can be hydrogenated to produce methane.

In order to be suitable as a precoat material for the pressure precoat filtration of coal-derived liquids, it is essential that the material pack into a bed having several important properties. More specifically, the bed must have the proper effective pore size, as low as 0.4 micron for some coal-derived liquids. The bed must be sufficiently open to permit high flow rates and yet permit the formation of a filter cake without plugging of the bed. In addition, the bed must be inert to the process liquid and must be able to withstand the pressure differentials of pressure precoat filtration, about 1 to 10 atmospheres across the filter. It is also highly desirable that the precoat material not act as a contaminant to downstream processing of filter cake.

In the prior art, pressure precoat filtration is carried out with a conventional-type rotary drum filter. A suitable filter apparatus and method of filtration for solvent refined coal unfiltered oil is shown and described in Edwards, M. S., Rodgers, B. R., and Salmon R; *Coal Technology Program Supporting Research and Development on Separations Technology: Phase I Report*, ORNL-TM-4801 Oak Ridge National Laboratory, 1975, pp. 4-10 which is herein incorporated by reference.

Referring to FIG. 1, this type of filter consists of a pressure vessel 1 containing an axially rotating cylindrical drum of fine mesh 2. During a precoat cycle, a slurry of about 1% by wt. of precoat material in organic solvent (preferably previously filtered product liquid) is passed through the filter under pressure. The precoat material is held up on the mesh and forms a precoat layer 15. During operation, a doctor blade 3 functions to maintain the thickness of the filter cake 4 (up to about ½) to provide suitable flows. The filter cake material is collected and discarded as a waste material or passed on to a subsequent gasifier. The gasifier may be any suitable apparatus for reacting the filter cake material accordingly to well-known gasification methods to provide a gaseous product such as $H_2$ or CO for use in the liquefaction process or methane for use as fuel. Care must be taken to minimize the amount of precoat material removed by the doctor blade as this is a source of inert material in the subsequent gasification step.

The precoat material used widely in the prior art was diatomaceous earth. The disadvantages of this material were its relatively high cost, its limited availability, and its contamination of the collected solids. Though it is ordinarily not considered in scarce supply, there are insufficient deposits of diatomaceous earth to fulfill the needs of the projected world-wide coal-liquefaction industry. Another disadvantage is that diatomaceous earth is very abrasive and frequently damages pumps used to move it through the system. Furthermore, the diatomaceous earth is not economically separable from the other solid residues in the gasification process and must be disposed of as waste material.

SUMMARY OF THE INVENTION

It is an object of this invention to provide a method of separating solids from a coal-derived liquid which used a processable material, rather than diatomaceous earth.

It is a further object to provide a filtration aid which enhances the filtration rate.

It is a further object to provide a precoat material which is substantially less expensive and more abundant and widely distributed than diatomaceous earth.

These and other objects are accomplished according to our invention by the use of coal itself as a filtering aid in the pressure precoat filtration of coal-derived liquids. The objects are accomplished in a method for separating solids from coal-derived liquid slurries in which said coal-derived liquid is passed under pressure through a filtration means, said filtration means comprising in combination a layer of precoat material capable of retaining solids from said coal-derived liquid to form a filter cake on said layer and said filter cake, the improvement in which said filtration means comprises 85–350 mesh particles of additional material selected from the group of anthracite coal, bituminous coal, lignite, and devolatilized coals. In one embodiment said precoat material comprises 85–350 mesh particles of material selected from the group of anthracite coal, bituminous coal, lignite, and devolatilized coals. In another embodiment, 85–350 mesh particles of material selected from the group of anthracite coal, bituminous coal, lignite, and devolatilized coals are added to the coal-derived liquid prior to filtration, whereby the filter cake comprises the additional particles. This embodiment may be used with a coal precoat or a diatomaceous earth precoat. By additional material, it is meant materials not already present in the coal-derived liquid to be filtered.

DETAILED DESCRIPTION

Figure 1:
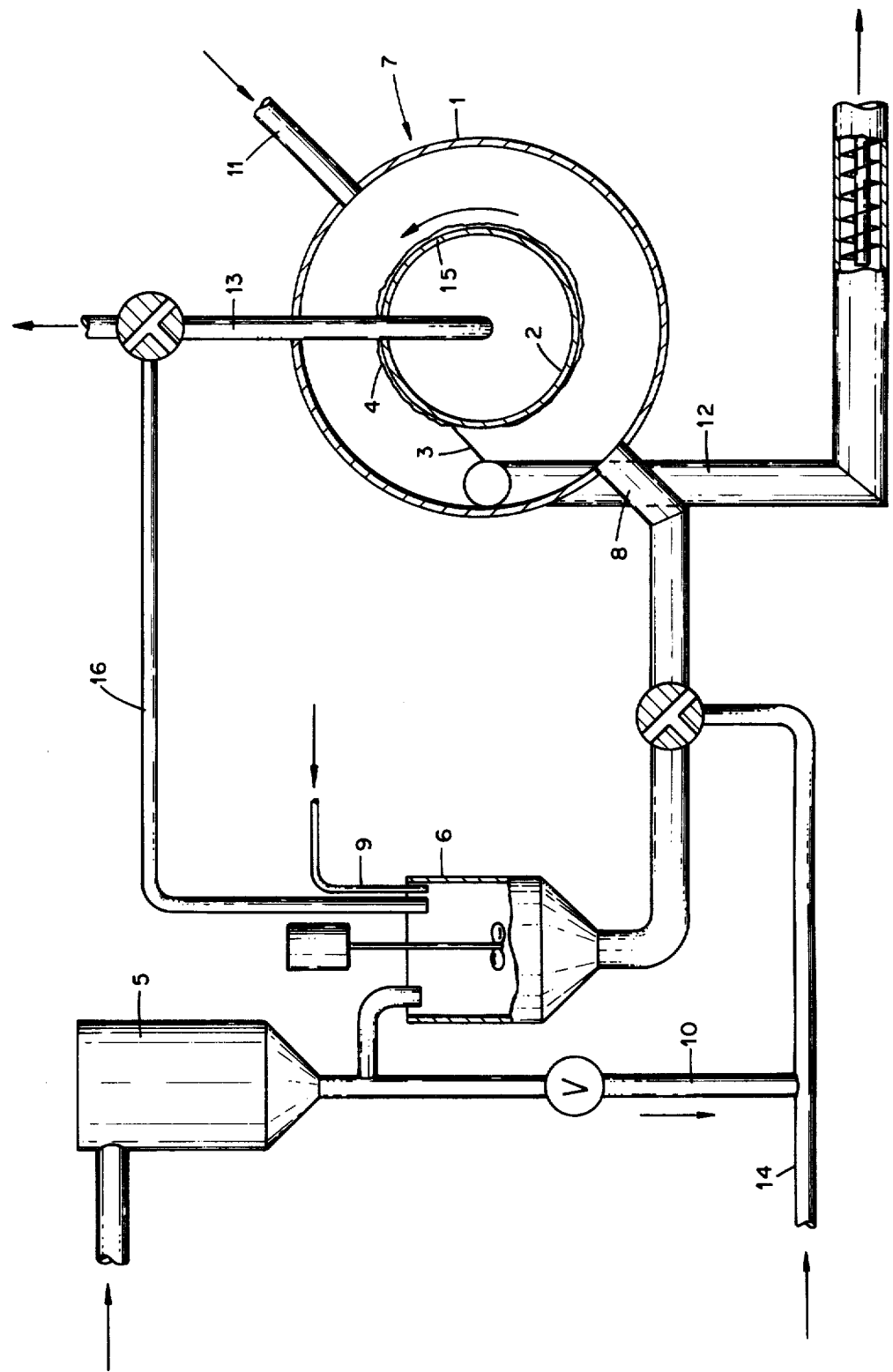
FIG. 1 is a schematic diagram of the pressure precoat filtration of coal-derived liquids in a rotary drum-type filter.

According to our invention, we have found that coal particles in the size range of 85–350 mesh have a markedly beneficial effect on the pressure precoat filtration of coal-derived liquids. As used herein, mesh sizes are U.S. Standard Sieve Series. The coal particles may be bituminous coal, anthracite coal, lignite, or devolatilized coals such as coke, char, etc. These coal particles may be added to the unfiltered coal-derived liquid directly as a body feed to enhance filtration rates. Alternately, they may be used as a precoat material for a pressure precoat filter. A coal body feed may be used with a diatomaceous earth precoat or with a coal precoat. Particles larger than 85 mesh do not permit the formation of the filter cake and particles smaller than 350 mesh are too fine to obtain suitable filtration rates.

A precoat of coal particles is provided in any conventional manner. For example, a slurry of about 1–10 wt.% coal in a liquid such as water or organic solvent is passed through a wire mesh capable of retaining the coal particles. This should preferably be done under flowing gas pressure. The precoat pressure is not critical and is normally about 0.1–10 atmospheres across the filter. The thickness of the precoat layer depends upon the particular filtration application. For example, longer filtration cycle times would require thicker precoat layers.

The type of coal to be used in our process is a function of the temperature of the filtration which in turn is governed by the viscosity of the coal-derived liquid to be filtered. For example, we have found that a bituminous coal such as Illinois No. 6 is effective up to about °450° F before the coal begins to soften and reduce the filtration rate. Anthracite, lignite, and devolatilized coals, having higher softening points than bituminous coals, are useful at higher temperatures.

One aspect of our invention is the discovery that coal particles have an extremely beneficial effect on the pressure precoat filtration of solids from coal-derived liquids from coal liquefaction processes. While it is not certain what the actual mechanism of filtration is, it is believed that it is a combination of a sorbtion of the small submicron size particles on the coal surface due to a natural affinity of coal for solid liquefaction residues, in combination with a physical trapping of solids within the pores and interstices of the precoat material. In this manner, small solid particles present in the unfiltered liquid adsorb onto the coal precoat and promote bridging to effect filter formation. This enhanced bridging effect greatly increases the filtration rate capability over diatomaceous earth, by reducing the thickness of filter cake required to provide efficient solids removal. With a coal or devolatilized coal precoat, the filter cake can be completely removed without sacrifice in product purity since a new filter cake begins forming in only a short time. A preferred method of operation of a drum-type pressure precoat filter is to have a precoat layer consisting essentially of 85-350 mesh particles of anthracite coal, bituminous coal, lignite, or devolatilized coal and to have the doctor blade advance to continuously remove at least a portion of the precoat with the filter cake. As the drum rotates, new filter cake is built up. The speed of advance and speed of rotation are correlated with the product purity, filtration rate, and carbon requirements of the subsequent gasification step for optimization. When used as a body feed, it is believed that coal particles collect in the filter cake to aid in the sorbtive recovery of solids and keep the filter cake from becoming too tightly packed.

While anthracite and charcoal have been used in the prior art for the clarification of aqueous streams, they were used largely as sorbtive mediums. See Streatfield, E. L., *Engineer, Long.* 1952, Vol. 193, pp. 771–4, Buller, E. L., *J. Amer. Wat. Wks, Assn.* 1935, Vol. 27, pp. 1161–5, and *The Chemical Age, Lond.* 1963, 89(2272) 164. It was by no means apparent that coal would be useful in the pressure precoat filtration of coal-derived liquids. For example, it was not known that 85–350 mesh particles of coal would pack into a suitable bed under the pressures of pressure precoat filtration, 1 to 10 atmospheres across the bed. Also it could not have been predicted that a bed of coal particles of 85–350 mesh would filter the particles out to the required levels or provide sufficient flow rates at the temperatures necessary for filtration of viscous coal-derived liquids, above 150° F. Furthermore, it could not be predicted what effect the organic coal-derived liquid would have on the coal particles above 150° F; whether it would partially dissolve the particles or change the packing characteristics during the filtration.

Generally, the particles should be at least about as large as the particles being filtered. The approximate range of coal particles useful as body feeds is about 85 to 350 mesh, and the percentage of body feed added to the unfiltered liquid should be about 1 to 50 % by weight of the solid content, depending upon both the amount required to produce maximum flow rate and to provide the carbon required by a downstream gasification process. The proper body feed content may be routinely determined for a particular process.

The use of coal as a precoat material and body feed in the pressure precoat filtration of solids from the coal-derived liquid of coal liquefaction processes possesses numerous advantages over the use of diatomaceous earth. Coal is about one-tenth the cost of diatomaceous earth and is already present at the liquefaction facility in the form of feed. Coal is not an impurity in subsequent gasification processes for filter cake material and is directly utilized in the gasification processes. Coal as a body feed, precoat material, or both can increase the filtration rate up to as much as 10 times over diatomaceous earth precoat. An additional advantage to the use of coal as a body feed or a precoat material is that this provides a convenient way of regulating the carbon content of the subsequent gasifier feed. For example, the rate of body feed flow and filter cake removal can be related to provide a filter cake product of the desired carbon content by regulating the depth of cut of the doctor blade. Furthermore, the use of coal as a filter aid completely eliminates the presence of abrasive diatomaceous earth in the filtration or subsequent gasification system.

As a demonstration of an operable pressure precoat filtration system, the following example is presented with reference to FIG. 1. This in not intended to be limiting, the invention being limited only by the claims.

EXAMPLE 1

In a precoat cycle, bituminous coal of 150 to 170 mesh is added from hopper 5 to mixer 6 where it is combined with previously filtered product to provide a precoat slurry of 3 wt.% coal. This slurry is introduced to the drum filter 7 through feed inlet 8, under a pressure of 50 psig to form precoat layer 15. Pressure for the precoat cycle is provided by $N_2$ flowing through mixer gas inlet 9. The coal-derived feed is solvent refined coal unfiltered oil having a solids content of about 8% by weight; 90% particles less than 1.7 microns and is introduced through coal-derived liquid feed line 14. Coal body feed is added through line 10 to about 5 wt.%. The filtration temperature is 350 to 400° F. Pressure for the filtration of 50 psig is provided through filter gas inlet 11. Doctor blade 3 continuously removes filter cake, advancing at a rate to remove a small amount of coal precoat. The filter cake reforms as the drum rotates. Filter cake containing char, ash, refractory organic solids and body feed is recovered through outlet 12 and transported to a gasifier (not shown). The filtrate exits through conduit 13. For a precoat cycle, filtrate is recycled to mixer 6 through recycle line 16.

The following experimental examples are presented to demonstrate the benefits of coal in the pressure precoat filtration of coal-derived liquids. The experimental runs were carried out in a laboratory-scale apparatus comprising a circular 200 mesh screen enclosed within a filter tube connected to a nitrogen pressure bottle. Liquid is introduced under pressure and the filtrate is received in a tared bottle atop a continuously weighing balance.

EXAMPLE II

Figure 2:
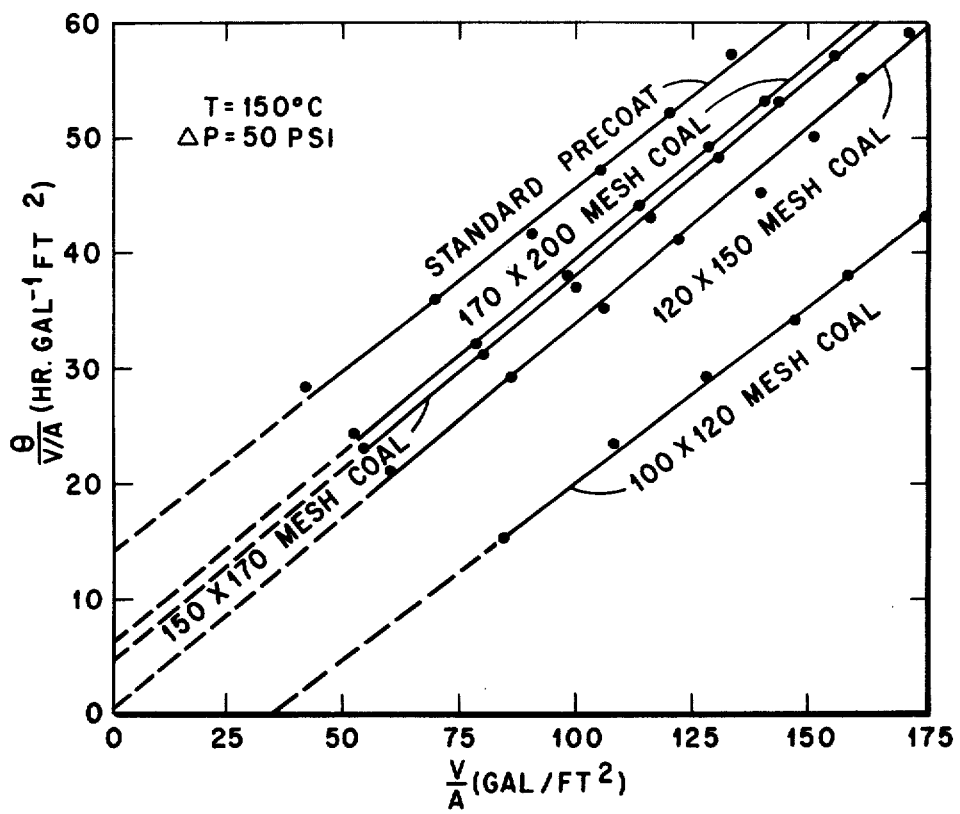
FIG. 2 is a graph showing the increased filtration rate attained according to our using coal as a precoat material.

Illinois No. 6 coal was crushed and dry sieved into size distributions as follows: 100 by 120 mesh (passed 100 mesh and held up on 120 mesh), 120 by 150 mesh, 150 by 170 mesh and 170 by 200 mesh. This material was deposited on the 200 mesh screen in a 5% wt. slurry in filtered solvent refined coal oil at 50 psig. Solvent refined coal unfiltered oil was passed through the precoat at 50 psig and 150° C and the filtration rates measured. The comparative filtration rates are shown in FIG. 2, where $\theta$ = time, $V$ = volume of filtrate collected and $A$ = filter cake surface area. Accordingly, the lower positions on the graph indicate higher filtration rates. The standard was FIBRE-FLO diatomaceous earth available from Johns Manville Co. The following table indicates the ash and sulphur content of the filtrate, which meet or exceed current EPA requirements for stationary power sources of 0.96% sulphur and 0.15% ash.

TABLE

| Precoat Coal | Filtrate Analyses (Wt. %) | |
|---|---|---|
| (mesh size) | Ash | Sulphur |
| 100 × 120 | 0.12 | 0.69 |
| 120 × 150 | < 0.05 | 0.61 |
| 150 × 170 | < 0.05 | 0.65 |
| 170 × 200 | < 0.05 | 0.66 |

EXAMPLE III

Figure 3:
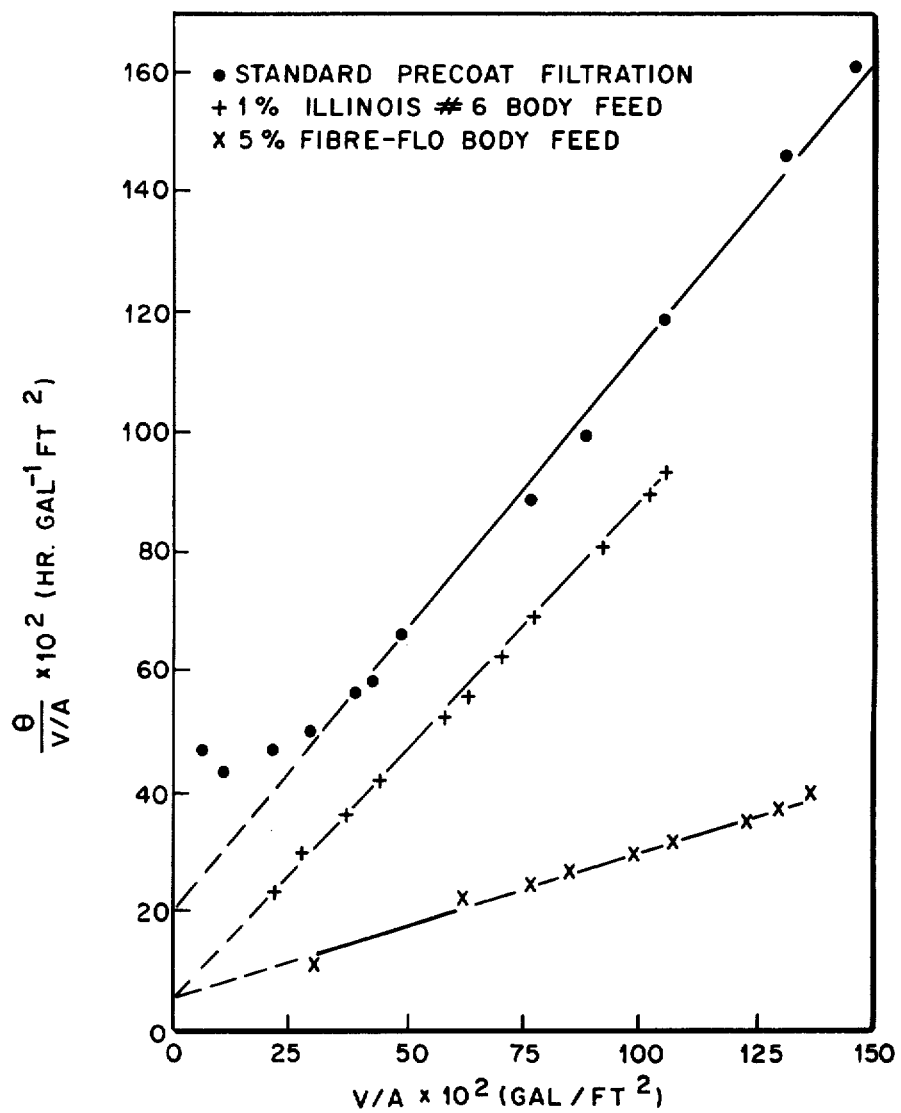
FIG. 3 is a graph showing the increased filtration rate attained when using coal as a body feed with a diatomaceous earth precoat.

Runs were carried out in a similar manner as Example II using FIBRE-FLO precoat with body feeds of 1% wt. Illinois No. 6 coal and 5% FIBRE-FLO. The results are depicted graphically in FIG. 3.

Having demonstrated the operability of our method, it is within the skill of those experienced in the field of pressure precoat filtration of coal-derived liquids to select the proper temperature, coal particle size, filtering and precoat pressures, or type of coal or devolatilized coal for the filtration of a particular coal-derived liquid. It is anticipated that solids-containing liquid streams in the petroleum refining industry are also amenable to filtration using coal according to our process and such liquid carbonaceous streams are contemplated as equivalents to coal-derived liquids in our process.

What is claimed is:

1. A method for separating solids such as char, ash, and refractory organic compounds from a viscous slurry comprising tars, asphaltenes, and up to 25 wt.% of said solids including ash particles smaller than 1 micron, said method comprising the steps of:
    a. forming a layer of partially solubilized 85–350 mesh particles of anthracite coal, bituminous coal, lignite, devolatilized anthracite coal, devolatilized bituminous coal, or devolatilized lignite on a filter media;
    b. filtering said viscous slurry through said layer and said media at a differential pressure of about 0.1–10 atmosphere across said media and said layer so as to recover a liquid containing less than 0.15 wt.% ash.

2. The method of claim 1 in which said layer is formed as a precoat on said filter media.

3. The method of claim 2 in which said differential pressure is about 1 to 10 atmospheres across said media.

4. The method of claim 2 in which said particles are added to said viscous slurry prior to said filtering step.

5. The method of claim 1 in which said particles are added to said viscous slurry prior to said filtering step.

6. The method of claim 1 in which said filtering step is carried out at a temperature above about 150° F.

7. The method of claim 1 in which said layer is formed from particles of anthracite coal, bituminous coal, or lignite.

* * * * *